P. E. WIRT.
PROCESS FOR TIRE CONSTRUCTION.
APPLICATION FILED JULY 6, 1910.

1,009,366.

Patented Nov. 21, 1911.

3 SHEETS—SHEET 1.

WITNESSES

INVENTOR
Paul E. Wirt
By
Attorney

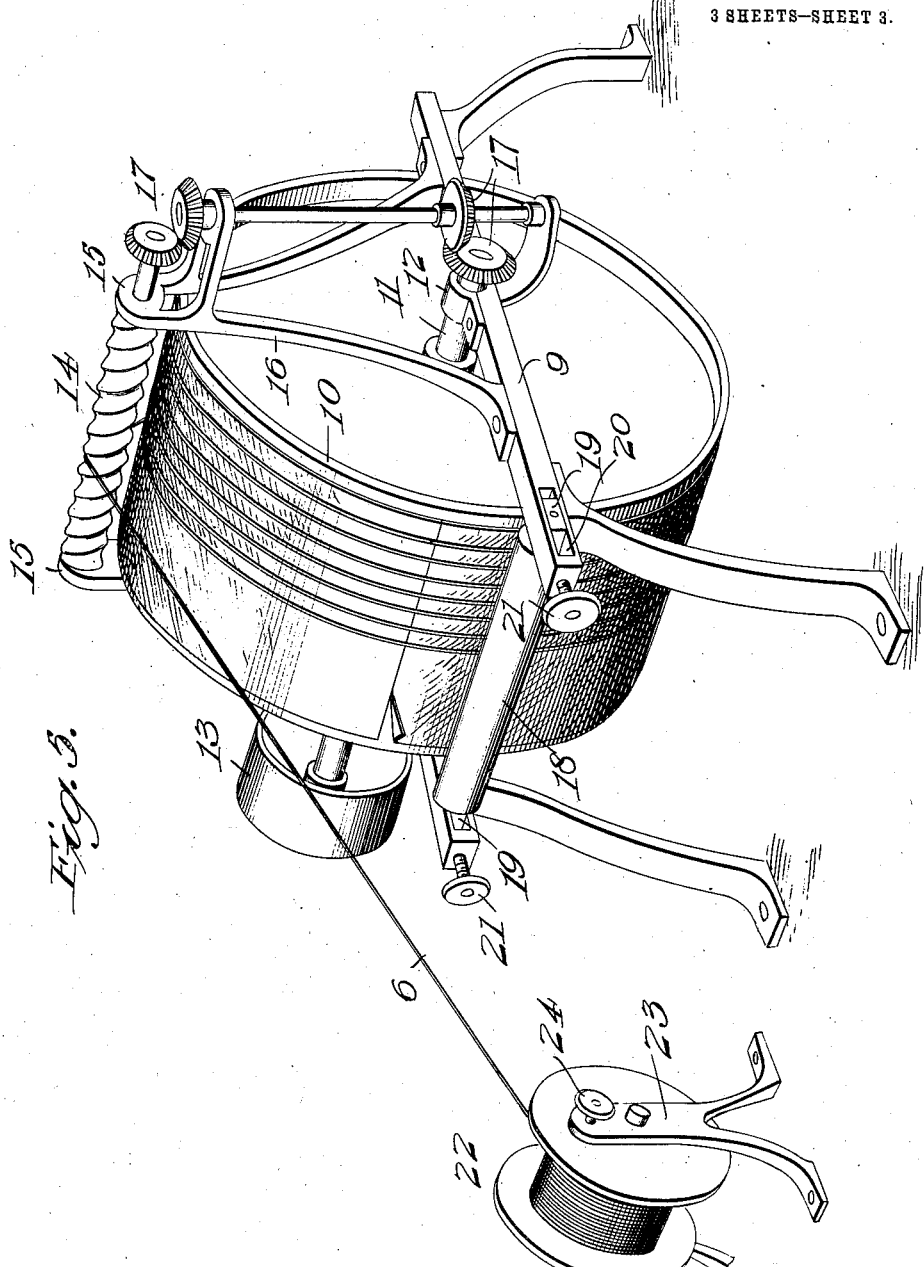

UNITED STATES PATENT OFFICE.

PAUL E. WIRT, OF BLOOMSBURG, PENNSYLVANIA.

PROCESS FOR TIRE CONSTRUCTION.

1,009,366. Specification of Letters Patent. Patented Nov. 21, 1911.

Application filed July 6, 1910. Serial No. 570,666.

*To all whom it may concern:*

Be it known that I, PAUL E. WIRT, a citizen of the United States, residing at Bloomsburg, in the county of Columbia and State of Pennsylvania, have invented certain new and useful Improvements in Processes for Tire Construction, of which the following is a specification.

This invention relates to the art of manufacturing tires for automobiles and other vehicles, and is intended to carry forward the general principle of the invention disclosed in and covered by my former Patent No. 951,873, dated Mar. 15, 1910.

To this end the present invention primarily contemplates an improved process for tire construction, particularly a material-forming process that develops a body material of such form and reinforcement as to provide when incorporated in a tire construction a tire having a maximum strength, integrity, resiliency, endurance and yielding wearing face, together with a maximum resistance against perforations and other injuries.

A special object of the invention is to provide means for quickly, accurately and economically forming a reinforced body material for tire construction purposes which can be handled in such dimensions as to readily and satisfactorily form the body part of a pneumatic tire, including the clencher elements thereof, without impairing the resiliency of the tire structure, while, at the same time, greatly strengthening said structure and effectively preventing blow-outs or rupture from the internal pressure.

Also the invention proposes to manufacture the reinforced body material in such a manner as to secure a uniform result in the production of a body material of great tensile strength and yet sufficiently flexible and resilient.

With these and many other objects in view which will more readily appear as the nature of the invention is better understood, the same consists in the novel construction and arrangement of parts hereinafter more fully described, illustrated and claimed.

Figure 1:
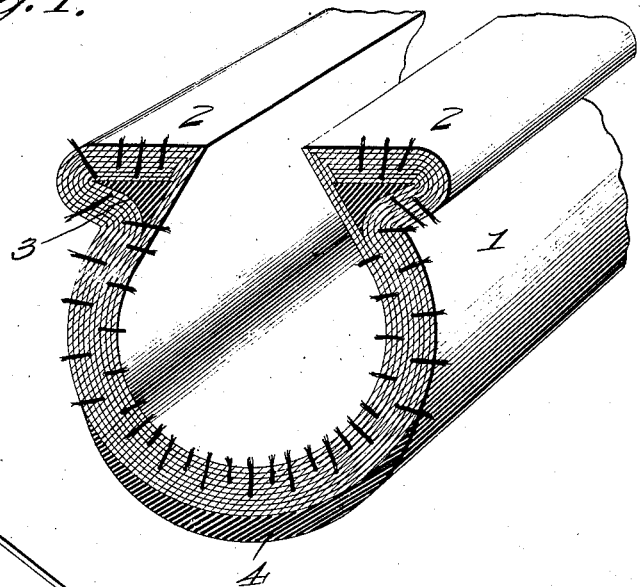
Figure 2:
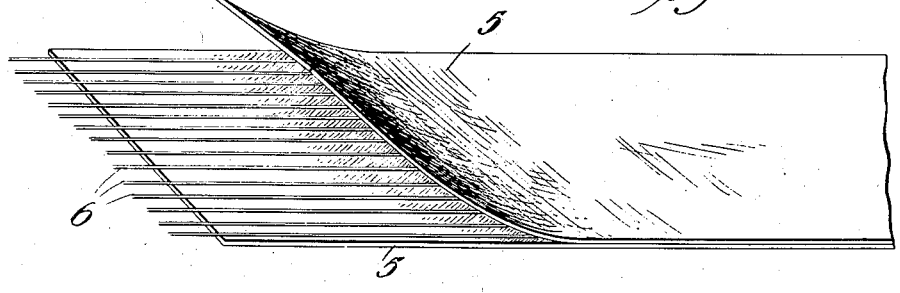
Figure 3:
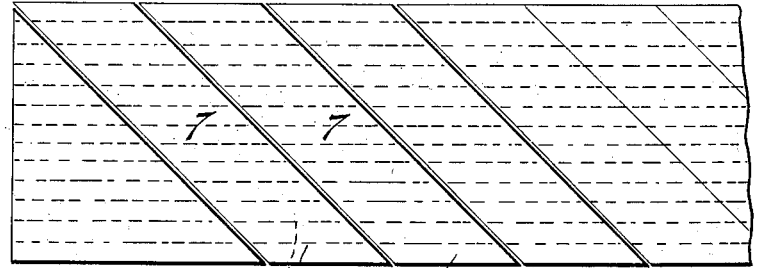
Figure 4:
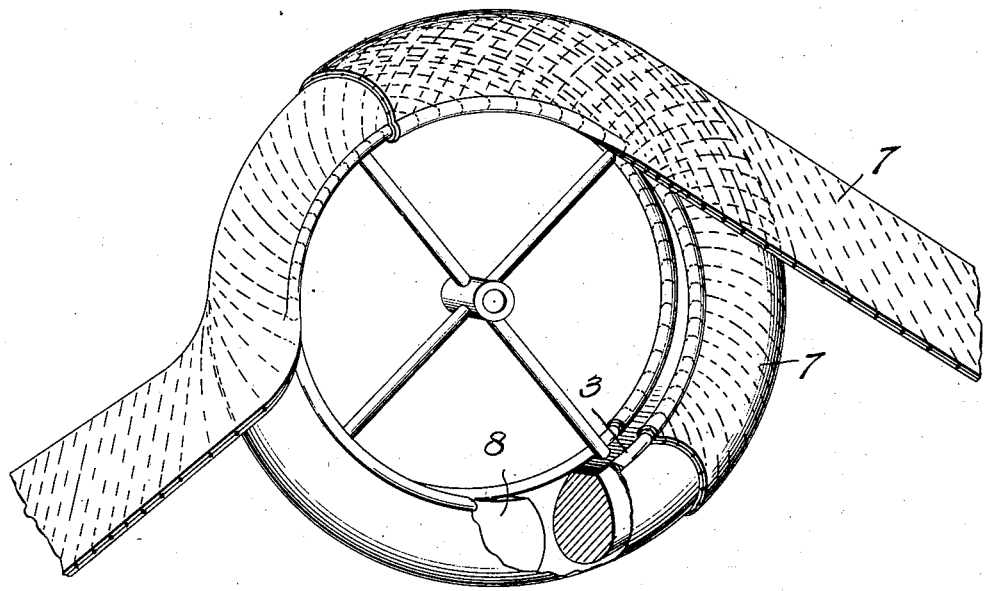
Figure 6:
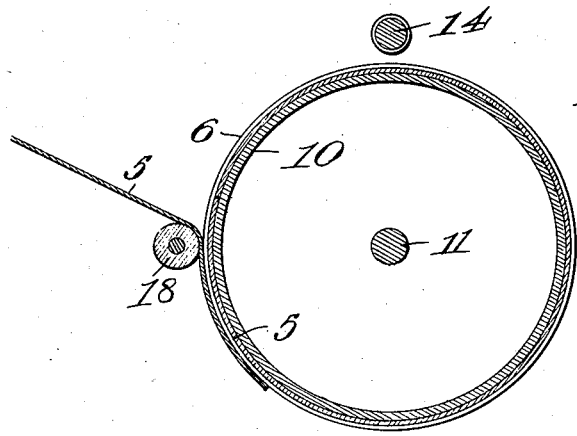

The essential features of the invention involved in carrying out the objects above indicated are necessarily susceptible to a wide range of modification without departing from the spirit or scope of the invention, but for illustrative purposes the preferred process steps are illustrated in the accompanying drawing, in which:

Figure 1 is a sectional perspective view of a pneumatic tire constructed in accordance with the present invention, and illustrating the body material incorporated therein to form the body portion of the tire and its clencher elements. Fig. 2 is a perspective view of a section of reinforced body material constructed in accordance with the present invention and showing one of the flexible fabric sheets lifted to expose the metallic reinforcing strands therein. Fig. 3 is a plan view of a finished section of the reinforced body material illustrating the step of cutting the same on the bias in strips ready to apply to the formation of a tire body. Fig. 4 is a sectional perspective view illustrating the application of the reinforced body material, in the building up of the tire body, including its clencher elements, about a core, the light or dotted lines indicating the location and direction of the interior flexible metal reinforcing strands. Fig. 5 is a perspective view of one type of forming apparatus that may be employed in carrying out the steps of the process in developing and forming the reinforced body material. Fig. 6 is a diagrammatic sectional view of the apparatus illustrating more plainly the method of introducing the second fabric sheet onto the reinforcing strands which are wound onto and pressed into the first fabric sheet which constitutes the base from which the body material is built up.

Like references designate corresponding parts in the several figures of the drawings.

According to the present invention it is the purpose thereof to develop and produce a reinforced body material of such strength and characteristics and of such dimensions that the same may be readily employed to build up therefrom the entire body portion and clencher elements of a pneumatic tire body or casing. Hence for illustrative purposes there is shown in Fig. 1 of the drawings a pneumatic casing in which the entire body portion of the case and its clencher elements are composed of the improved body material. Referring particularly to said illustration in Fig. 1 of the drawings, the entire casing is designated in its entirety by the numeral 1, and as shown the said casing is formed of any desired number of superposed sections or strips of the reinforced body material, and includes the usual clencher elements 2, which are formed about the clencher cores 3. Of course in the practical manufacture of a tire casing according to the present invention, after building up the body part of the casing from the improved reinforced body material, the casing is supplied with an outer rubber covering 4 bonded into place, and which rubber covering may or may not include a tread portion such as suggested in Fig. 1 of the drawing.

The improved reinforced body material which is employed for building up the tire casing or tire body, as above indicated, primarily and essentially consists of separate layers of sheet material 5 and metal reinforcing strands 6 embedded within and between such layers, and hence incorporated therewith to form the complete body material which is employed in sheet form in the manner to be presently explained. The sheet material 5 is preferably the rubberized fabric commonly used in ordinary tire construction, and the reinforcing elements or strands 6 preferably consist of strands of fine, soft, wire braided together, such as exemplified by the well-known corded or braided picture-hanging wire. It has been found by practical observation and tests that reinforcing wires or strands of this character will yield radially, are not liable to breakage and have great tensile strength. Besides, should the wires or strands 6 break from any cause, each individual strand is so pliable and soft that it will readily yield, and will not puncture or enter the surrounding fabric or material, which is an advantage of considerable importance in tire constructions where it is the constant aim to preserve the integrity of the material at all points throughout the tire.

In making a section of the body material, consisting of the superposed layers of sheet material 5 and the metal reinforcing strands between them, the present invention provides for arranging the strands in a stretched condition, that is while in tension, over what may be termed the base sheet of the fabric or equivalent flexible material, then applying a rolling pressure to the said strands upon the base sheet, and then applying the other layer or cover sheet over the strands and at the same time applying pressure to the cover sheet, with the result of compactly and intimately incorporating both layers of the sheet material with the metal reinforcing strands, while also providing an even surface for the body material so that it may be readily and smoothly laid up upon the core, or upon other strips of like material, in building up the tire casing. It will thus be seen that this method provides means for forming a sheet or section of body material of as little thickness as possible and, in fact, of little greater thickness, if any, than the thickness of the ordinary rubberized canvas sheets commonly employed in tire construction, but, unlike the latter sheets, having a reinforcement of such a character as to permit the entire casing to be made up therefrom and fulfil all of the exacting requirements of a pneumatic tire casing.

After forming a section of the body material having the construction shown in Fig. 2 of the drawings, the formed section or sheet is cut diagonally or on the bias into strips 7 of the desired width, as plainly shown in Fig. 3 of the drawing, and these bias cut strips, with the strands therein lying diagonally, are handled and manipulated upon the usual tire forming core 8 shown in Fig. 4 of the drawing. This tire-forming core 8 has associated therewith the usual clencher cores 3 previously referred to, and the strips 7 of body material are pressed into shape about the core and the edges of the body material are pressed into the clencher elements or hooks 2 about the clencher cores 3, it being observed that the metal reinforcement likewise enters into the said clencher elements.

In the above connection it should be noted that the present application discloses a practical process for forming the reinforced body material in extensive lengths, and in strips of sufficient width to be conveniently and readily worked at the edges into the clencher elements. This is a feature which further exemplifies the utility and scope of my former patent aforesaid, No. 951,873, wherein comparatively short and narrow strips of reinforced body material are illustrated. It is therefore the purpose of the present application to provide a process possessing special utility in the manufacture of long and wide strips of reinforced body material, which may be laid in any desired number of layers according to the thickness of tire casing desired, and at the same time may be utilized in long continuous lengths extending entirely about the circumference or perimeter of the tire body without overlap, crimping or gaping, and, at the same time, producing, when the casing is fully built up, a flat and smooth exterior surface for the final covering of rubber. Hence instead of employing comparatively narrow and short strips, which are laid on flatwise, with the adjacent strips in each layer thereof arranged in abutting edge to edge relation without overlap, as suggested in one of the forms of application in my former patent, the present invention produces a long and wide strip of body material that may be carried in single lengths entirely about the tire's circumference, any number of these strips being superposed according to the thickness of casing desired, all of which is plainly evident from Fig. 4 of the drawings.

While a wide range of apparatus and devices may be utilized in carrying out the process of the present invention, one form of apparatus is suggested in Fig. 5 of the drawing, said apparatus comprising means for carrying out in a thoroughly practical manner the process steps hereinbefore pointed out. The forming apparatus, shown in Fig. 5, essentially comprises in its general organization a machine stand or frame designated in its entirety by the reference numeral 9, supporting therein a rotatable holding drum 10. The holding drum 10 presents a wide, smooth, periphery upon which the body material is held and developed, and the said drum is carried upon an axle 11 journaled in suitable bearing 12 on the stand or frame, and to one extremity of which is fitted a belt pulley 13 for the power belt connection. Arranged above the holding drum 12 and in spaced parallel relation to its periphery is a spirally grooved equivalent feeding and distributing roller 14 having its spindle extremities journaled in suitable bearings 15 at the upper ends of bearing brackets 16 rising from the side portions of the machine stand or frame 9, and the said roller 14 is geared by means of suitable gear connections 17 with the axle of the drum, thus providing a positive drive from the rotatable drum to the said roller 14. In addition to the elements referred to the forming apparatus includes a pressure roller 18 arranged at one side thereof in parallel relation to the periphery of the drum. The spindle extremities of the roller 18 are mounted in the adjustable bearing boxes 19 supported in guideways 20 at the sides of the machine stand or frame 9, and adjusted by means of the presser screws 21, which serve to maintain the roller 18 under any desired degree of pressure against the material held and carried by the rotatable drum 10. In connection with the elements of the apparatus above referred to, there is employed a feeding spool 22 for the reinforcing strand or wire 6. The spool 22 is journaled in suitable bearings 23 and carries a quantity of the reinforcing wire which is fed therefrom to the roller 14 and by the latter to the fabric or sheet material upon the drum 10. A proper tension is placed upon the wire fed from the spool 22 by means of a tension or equivalent device 24 having frictional or equivalent engagement with the spool body, as will be well understood.

In carrying out the process with the apparatus above described, the base layer or sheet of fabric material 5 is first spread about the flat and ample periphery of the holding drum 10, as plainly shown in Fig. 5 of the drawing. Then the metal reinforcement, whether in the form of a braided wire or equivalent strand, is wound or stretched at graduated intervals apart, through the instrumentality of the elements 14, 22 and 24, upon the base sheet of fabric material which is first placed upon the drum. The feeding of the reinforcing strand as illustrated in Fig. 5 of the drawings is continued until the whole surface of the fabric or other sheet material is covered at intervals to the extent necessary. After the metal strand is laid tightly upon the base layer of sheet material, the second or covering layer of sheet material is superimposed upon the metal strands and rolled and compacted into shape by the action of the rotating drum combined with the pressure roll 18, as plainly shown in Fig. 6 of the drawings. The amalgamation of the fabric sheets with the reinforcing strands under tension is thus effected, after which the body material is removed from the large drum by severing the metal strands between the ends of the fabric, thus producing a wide and lengthy sheet ready for the use previously explained. It will thus be observed that the rolling process described, while the material is upon the drum, flattens or compacts the whole into one flexible sheet, so that when cut diagonally into strips of the desired width for making the casing body it may be easily and readily formed into such body in the usual way. The diagonal cutting of the reinforced body material into the requisite sized strips places the metal obliquely or diagonally of the fabric strips, and not parallel with them, so that the whole stretches, yields, or forms readily and easily to shape over the form or cores upon which the tires are usually built.

While emphasis is laid on the preferred steps of arranging the reinforcing strands in a stretched condition over the base sheet of the fabric or equivalent flexible material and then applying a rolling pressure directly to the said strands upon the base sheet before the application of the second flexible sheet and the application of pressure to the latter, it will be understood that the invention may be carried out by the alternative steps herein indicated, that is to say, after the metal strand is laid tightly upon the base layer of sheet material, the second or covering layer of the material is superimposed upon the metal strands, and then the whole rolled and compacted into shape by the action of the rotating drum combined with the pressure roll 18.

I claim:—

1. A process for making body material for tire construction which consists in first cutting a rubberized fabric sheet into a predetermined length and width, then arranging metallic reinforcing strands, under tension, in spaced apart relation upon said sheet, incorporating said strands with said sheet under pressure, and finally cutting the compacted material on the bias and transversely into strips.

2. A process for making body material for tire construction which consists in first cutting into similar lengths and widths separate sheets of flexible material, arranging reinforcing strands at graduated intervals apart upon one of said sheets, pressing the strands into the said sheet, then pressing the second sheet onto the said strands and first sheet, and then cutting the compacted material diagonally into strips.

3. A process for making body material for a tire construction which consists in arranging reinforcing strands at graduated intervals apart upon a fabric sheet, pressing said strands into said sheet, then pressing a second sheet onto the first sheet and onto the strands, and then cutting the compacted material diagonally into strips.

4. A process for making body material for tire construction, which consists in cutting into similar lengths and widths separate sheets of flexible material, uniting said separate sheets together and upon an incased metal reinforcement by pressure, and then cutting the compacted material diagonally into strips of a length to encircle the circumference of a tire-forming core longitudinally and of a width to embrace the said core transversely, including the clencher cores.

5. A process for making body material for tire construction which consists in first cutting into similar lengths and widths separate sheets of flexible material, arranging reinforcing strands at graduated intervals apart upon one of said sheets by a wrapping action, pressing the strands into the said sheet while wrapping thereon, and then wrapping and pressing the second sheet onto the first sheet and onto the said strands, and finally cutting the compacted material on the bias into strips.

6. A process for making body material for tire construction which consists in first cutting into similar lengths and widths separate sheets of flexible material, wrapping a continuous wire length at spaced intervals apart upon one of said sheets, pressing the wire into the said sheet, then wrapping and pressing the second sheet onto the first sheet and onto the strand, then cutting the convolutions of the wire at the ends of the sheets of flexible material, and finally cutting the compacted material diagonally into strips.

In testimony whereof I hereunto affix my signature in the presence of two witnesses.

PAUL E. WIRT.

Witnesses:
C. W. FUNSTON,
E. H. TROXELL.